(12) United States Patent
Wang et al.

(10) Patent No.: US 10,099,679 B2
(45) Date of Patent: Oct. 16, 2018

(54) BATTERY STATE AND PARAMETER ESTIMATION USING A MIXED SIGMA-POINT KALMAN FILTERING AND RECURSIVE LEAST SQUARES TECHNIQUE

(71) Applicants: Deqiang Wang, Hamilton (CA); Pawel Malysz, Shelby Township, MI (US); Hong Yang, Rochester Hills, MI (US); Ali Emadi, Burlington (CA)

(72) Inventors: Deqiang Wang, Hamilton (CA); Pawel Malysz, Shelby Township, MI (US); Hong Yang, Rochester Hills, MI (US); Ali Emadi, Burlington (CA)

(73) Assignees: FCA US LLC, Auburn Hills, MI (US); MCMASTER UNIVERSITY, Hamilton, Ontario (CA)

( * ) Notice: Subject to any disclaimer, the term of this patent is extended or adjusted under 35 U.S.C. 154(b) by 0 days.

(21) Appl. No.: 15/298,314

(22) Filed: Oct. 20, 2016

(65) Prior Publication Data
US 2018/0111599 A1 Apr. 26, 2018

(51) Int. Cl.
*B60W 20/13* (2016.01)
*H01M 10/48* (2006.01)
(Continued)

(52) U.S. Cl.
CPC ............ *B60W 20/13* (2016.01); *B60W 10/06* (2013.01); *B60W 10/08* (2013.01); *H01M 10/48* (2013.01);
(Continued)

(58) Field of Classification Search
CPC ...... B60W 20/13; B60W 10/06; B60W 10/08; B60W 2510/244; H01M 10/48; H01M 10/486; H01M 2220/20; Y10S 903/93
(Continued)

(56) References Cited

U.S. PATENT DOCUMENTS 7,521,895 B2   4/2009 Plett
8,041,522 B2   10/2011 Plett
(Continued)

OTHER PUBLICATIONS

Gregory L. Plett, Sigma-Point Kalman Filtering for Battery Management Systems of LiPB-Based HEV Battery Packs, Elsevier B.V., Science Direct, Journal of Power Sources 161, Mar. 9, 2006, pp. 1356-1368, 13 pages.
(Continued)

*Primary Examiner* — Gertrude Arthur Jeanglaude
(74) *Attorney, Agent, or Firm* — Ralph E. Smith (57) ABSTRACT

A battery management system for an electrified powertrain of a hybrid vehicle includes one or more sensors configured to measure voltage, current, and temperature for a battery system of the hybrid vehicle and a controller. The controller is configured to obtain an equivalent circuit model for the battery system, determine a set of states for the battery system to be estimated, determine a set of parameters for the battery system to be estimated, receive, from the sensor(s), the measured voltage, current, and temperature for the battery system, using the equivalent circuit model and the measured voltage, current, and temperature of the battery system, estimate the sets of states and parameters for the battery system using a mixed sigma-point Kalman filtering (SPKF) and recursive least squares (RLS) technique, and using the sets of estimated states/parameters for the battery system, control an electric motor of the electrified vehicle.

15 Claims, 7 Drawing Sheets

(51) Int. Cl.
  *B60W 10/06* (2006.01)
  *B60W 10/08* (2006.01)
  *B60L 11/00* (2006.01)

(52) U.S. Cl.
  CPC .... *H01M 10/486* (2013.01); *B60W 2510/244* (2013.01); *H01M 2220/20* (2013.01); *Y10S 903/93* (2013.01)

(58) Field of Classification Search
  USPC ........................................ 701/22; 180/65.265
  See application file for complete search history.

(56) References Cited

U.S. PATENT DOCUMENTS

| | | | |
|---|---|---|---|
| 9,321,368 B2* | 4/2016 | Yang ................... | B60L 11/1861 |
| 2015/0197164 A1* | 7/2015 | Lee ..................... | B60L 11/1864 |
| | | | 701/22 |
| 2016/0084913 A1* | 3/2016 | Lupo .................. | G01R 31/3624 |
| | | | 702/63 |
| 2017/0254858 A1* | 9/2017 | Weicker ............. | G01R 31/3648 |

OTHER PUBLICATIONS

Pawel P. Malysz, Lucia Gauchia, Hong H. Yang; Chapter 7, Fundamentals of Electric Energy Storage Systems, Advanced Electric Drive Vehicles (2014): pp. 237-282, 48 pages.

Rui Xiong, Fengchun Sun, Zheng Chen, Hongwen He; A Data-Driven Multi-Scale Extended Kalman Filtering Based Parameter and State Estimation Approach of Lithium-Ion Polymer Battery in Electric Vehicles; Elsevier Ltd., Apr. 28, 2013, Applied Energy 113 (2014) 463-476, 13 pages.

Shijie Tong, Matthew P. Klein, Jae Wan Park; On-Line Optimization of Battery Open Circuit Voltage for Improved State-of-Charge and State-of-Health Estimation; Elsevier BV, Oct. 30, 2014, Journal of Power Sources 293 (2015) 416-428, 13 pages.

Taesic Kim, Yebin Wang, Zafer Sahinoglu, Toshihiro Wada, Satoshi Hara, Wei Qiao; Fast UD Factorization-Based RLS Online Parameter Identification for Model-Based Condition Monitoring of Lithium-ion Batteries, 2014 American Control Conference (ACC), Jun. 4-6, 2014, Portland, OR, pp. 4410-4415, 6 pages.

* cited by examiner

Figure 5B

BATTERY STATE AND PARAMETER ESTIMATION USING A MIXED SIGMA-POINT KALMAN FILTERING AND RECURSIVE LEAST SQUARES TECHNIQUE

FIELD

The present application generally relates to a battery management system for an electrified powertrain of a hybrid vehicle.

BACKGROUND

Some hybrid vehicles include an electrified powertrain comprising an electric motor that is powered by a battery system. Such hybrid vehicles include battery electric vehicles (BEV), plug-in hybrid electric vehicles (PHEV), and the like. These hybrid vehicles include battery management systems (BMS) configured to monitor the battery system. This monitoring typically includes estimating states of the battery system (state of charge (SOC), voltages, etc.) and parameters of the battery system (resistances, time constants, etc.).

These states and parameters are also utilized to determine other states/parameters, such as the state of power (SOP) of the battery system and/or the state of health (SOH) of the battery system. Linear models are often used for this state/parameter estimation, but these models are typically inaccurate. Non-linear models could be used instead, but these models are typically difficult to tune. Accordingly, while such BMS work for their intended purpose, there remains a need for improvement in the relevant art.

SUMMARY

According to an aspect of the invention, a battery management system for an electrified powertrain of a hybrid vehicle is presented. In one exemplary implementation, the system includes one or more sensors configured to measure voltage, current, and temperature for a battery system of the hybrid vehicle and a controller configured to: obtain an equivalent circuit model for the battery system; determine a set of states for the battery system to be estimated; determine a set of parameters for the battery system to be estimated; receive, from the one or more sensors, the measured voltage, current, and temperature for the battery system; and using the equivalent circuit model and the measured voltage, current, and temperature of the battery system, estimate the sets of states and parameters for the battery system using a mixed sigma-point Kalman filtering (SPKF) and recursive least squares (RLS) technique; and using the sets of estimated states/parameters for the battery system, control an electric motor of the electrified vehicle.

In some implementations, the controller is configured to estimate: the set of states for the battery system using an SPKF technique; and the set of parameters for the battery system using an RLS technique. In some implementations, the controller is further configured to estimate: the set of parameters for the battery system estimated using the RLS technique are an input for the SPKF technique; and the set of states for the battery system estimated using the SPKF technique are an input for the RLS technique. In some implementations, the set of states includes at least one of a state of charge (SOC) of the battery system and a voltage of the battery system.

In some implementations, the SPKF technique and the RLS technique are both configured to estimate a particular state or parameter for the battery system, and wherein the controller is configured to estimate the particular state or parameter of the battery system based on at least one of these estimates. In some implementations, the controller is further configured to calculate a covariance indicative of a confidence in each estimate of the particular state or parameter for the battery system, wherein the controller is configured to utilize the covariance in estimating the particular state or parameter of the battery system. In some implementations, the controller is configured to estimate the particular state or parameter for the battery system based on an average of the estimates from the SPKF and RLS techniques.

In some implementations, the controller is configured to estimate the set of parameters for the battery system using the RLS technique based further on a tuned forgetting factor. In some implementations, the set of parameters includes at least one of a resistance and a charge/discharge time constant for the battery system. In some implementations, the equivalent circuit model is an asymmetric equivalent circuit model having charge/discharge asymmetry.

In some implementations, the controller is further configured to: obtain an SPKF rate at which to perform the SPKF technique; obtain an RLS rate at which to perform the RLS technique; and estimate the sets of states and parameters for the battery system using the SPKF and RLS techniques according to their respective rates. In some implementations, the SPKF rate is greater than the RLS rate.

In some implementations, the controller is further configured to estimate at least one of a state of power (SOP) and a state of health (SOH) for the battery system based on the sets of estimated states and parameters. In some implementations, the controller is configured to control the electric motor based further on the at least one of the SOP and the SOH for the battery system. In some implementations, the hybrid vehicle comprises an engine; and the controller is configured to coordinate control of the engine and the electric motor based on the estimated states/parameters to maximize usage of the electric motor.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As previously mentioned, there remains a need for an accurate and easily tunable battery management system (BMS). Battery state and parameter estimation performance could be improved by updating battery model parameters online. Conventional Kalman filter-type methods (e.g., extended Kalman filtering, or EKF) utilize linear battery models. To further improve estimation performance, however, the non-linearities in the battery model could be handled by the estimation algorithms. Accordingly, an improved BMS and an improved battery state and parameter estimation technique utilizing mixed sigma-point Kalman filtering (SPKF) and recursive least squares (RLS) are presented. SPKF estimates states of the battery system (state-of-charge (SOC), voltage, etc.) and is paired with recursive least squares (RLS) to achieve parameter identification of the equivalent circuit model parameters.

SPKF provides much better performance than other similar techniques (e.g., EKF using a first order Taylor extension to linearize non-linear functions to deal with the non-linearity), particularly when dealing with a non-linear model. Due to the difficulty of modeling process noise tuning of Kalman filter-type methods, including SPKF, RLS represents a good alternative to estimate such parameters since it uses a linear-in-parameter measurement only model filter structure and a single tunable filter variable. Other benefits include charge/discharge asymmetry, non-linear hysteresis, self-discharge, non-linear resistance terms, multi-scaling (see below), and state/parameter estimated mixing/blending (e.g., when RLS and SPKF both estimate the same term). In other words, the advantages of SPKF and RLS are used to compensate for each other's disadvantages.

Example advantages include the robustness and accuracy of SOC estimation capability from SPKF and efficient on-line batter internal parameter estimation capability from RLS that are then used for SOP estimation. In some implementations, the mixed SPKF-RLS technique could be multi-scaled by assuming that battery system parameters remain constant during short time intervals. More particularly, parameter estimations using RLS could be performed on a macro (slow) time scale, whereas state estimations using SPKF could be performed on a micro (fast) time scale. The benefits of the mixed SKPF-RLS technique include, but are not limited to, reducing overall size of the battery system and reducing system cost (e.g., easier tuning/calibration), as well as increased performance and operational life of the battery system due to increased robustness. For example, these techniques could be particularly useful in highly dynamic driving situations.

Figure 1:
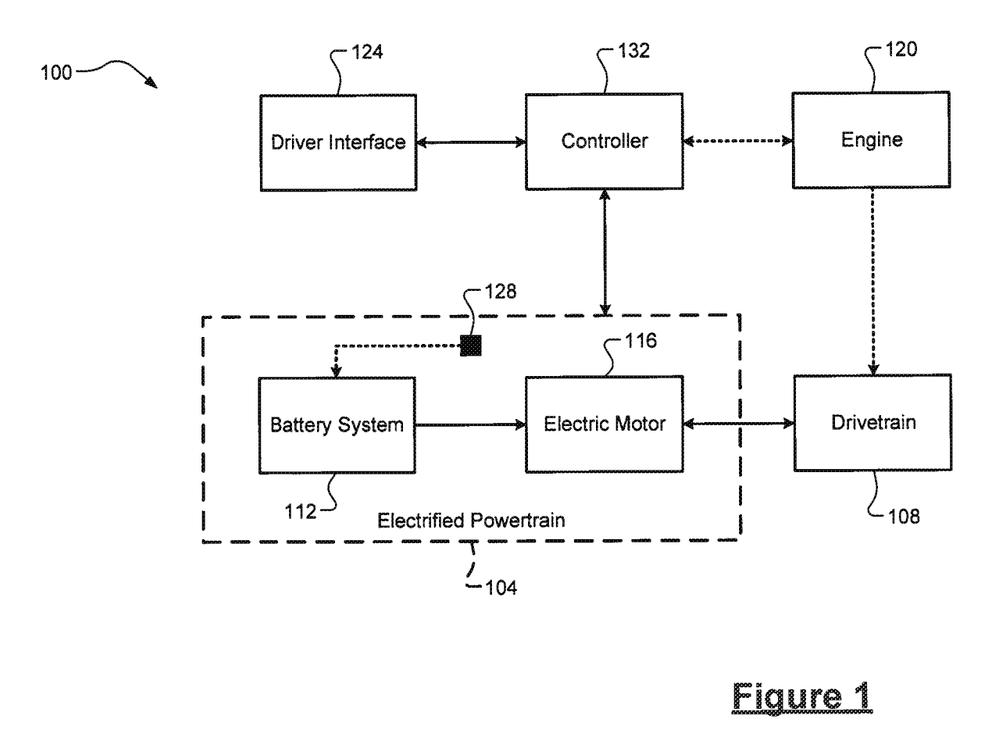
FIG. 1 is a functional block diagram of an example hybrid vehicle according to the principles of the present disclosure.

Referring now to FIG. 1, an example vehicle 100 is illustrated. In one exemplary implementation, the vehicle 100 is a hybrid vehicle. Non-limiting examples of the vehicle 100 include an electric vehicle (EV), a hybrid electric vehicle (HEV), a plug-in HEV (PHEV), and an extended range electric vehicle (EREV). It will be appreciated, however, that the techniques of the present disclosure could be extended to any vehicle including a battery system. The vehicle 100 includes an electrified powertrain 104 configured to generate torque for a drivetrain 108 to propel the vehicle 100. The electrified powertrain 104 includes an electric motor 112 and a battery system 116. The vehicle 100 optionally includes an engine 120, which could be used, for example, for recharging the battery system 116 and/or for generating the torque for the drivetrain 108. The torque could be generated in response to a torque request received via a driver interface 124.

The battery system 116 is any suitable battery system configured to generate a current to power the electric motor 112. In one exemplary implementation, the battery system 116 includes a plurality of lithium-ion (Li-ion) batteries connected together. The battery system 116 has one or more sensors 128 associated therewith, which are configured to measure current, voltage, and temperature of the battery system 116. A controller 132 is configured to receive these measurements and control the electric motor 112 based on estimated states/parameters of the battery system 116. The controller 132 is also configured to output information to the driver interface (SOC percentage, vehicle range, etc.). Examples of the controller 132 include an application-specific integrated circuit (ASIC) and one or more processors operating in a parallel or distributed architecture plus a non-transitory computer-readable medium (memory) having a set of instructions stored thereon for execution by the processor(s). While a single controller 132 is shown, it will be appreciated that the vehicle 100 could include multiple controllers, such as a battery management system controller that performs the functionality herein and communicates with another controller, such as an engine control unit (ECU).

Figure 2:
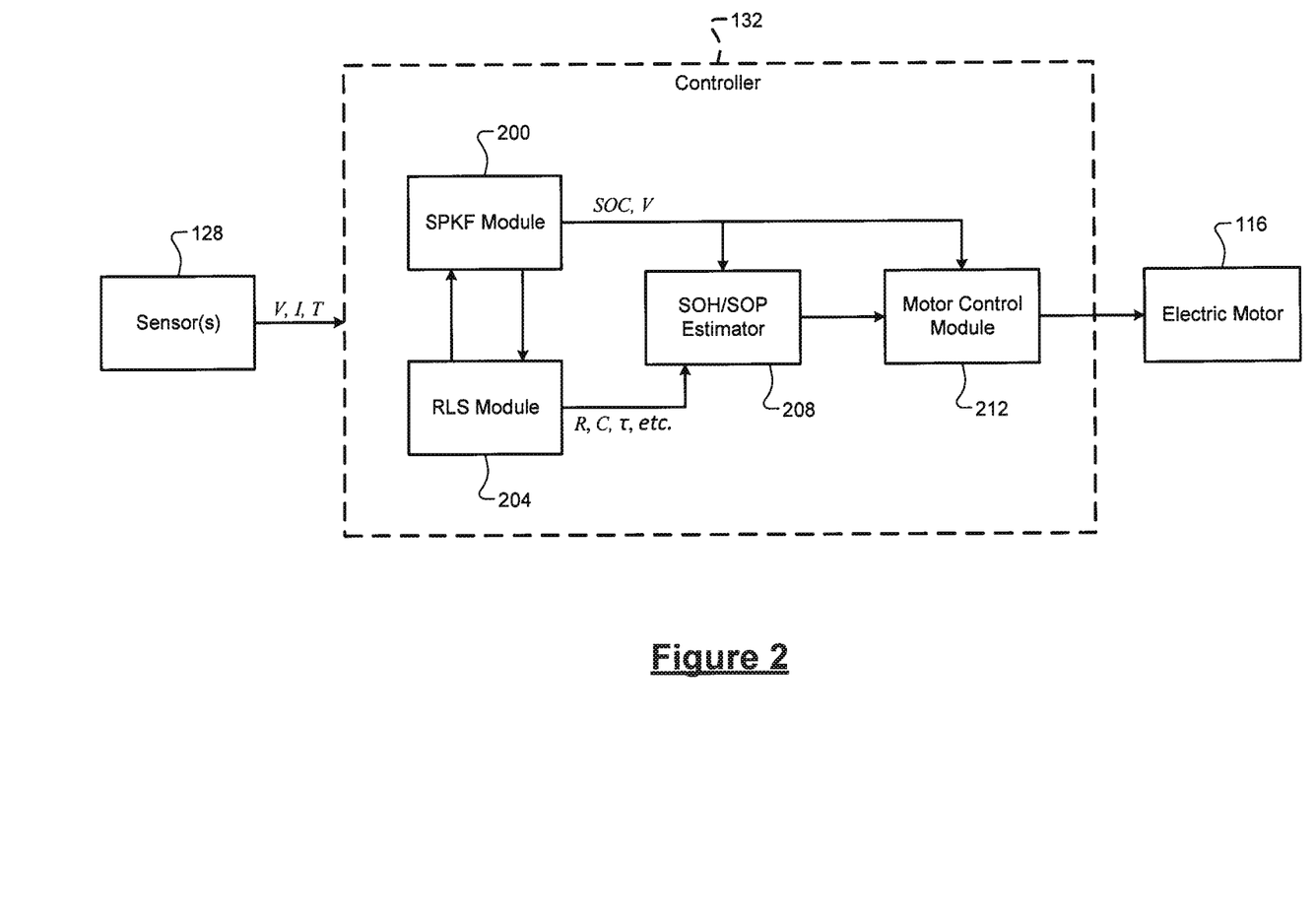
FIG. 2 is a functional block diagram of an example configuration for a controller of the hybrid vehicle according to the principles of the present disclosure.

Referring now to FIG. 2, a functional block diagram of an example configuration of the controller 132 is illustrated. The controller 132 receives information as input from the one or more sensors 128. In one exemplary implementation, this information includes voltage V, current I, and temperature T of the battery system 116. It will be appreciated that more or less information could be received from the sensor(s) 128, such as only voltage and current. Both an SPKF module 200 and an RLS module 204 are configured to receive and utilize at least some of these inputs. The SPKF module 200 is configured to perform an SPKF technique as discussed herein. The RLS module 204 is configured to perform an RLS technique as discussed herein. In one exemplary implementation, these modules 200, 204 are further configured to utilize the outputs of the other module as additional inputs.

Example outputs of the SPKF module 200 include SOC and voltages (referred to generally as V). Example outputs of the RLS module 204 include resistances, capacitances, and time constants (referred to generally as R, C, and $\tau$, respectively). The outputs of these modules 200, 204 are utilized by an SOH/SOP estimator 208 to estimate at least one of SOH and SOP for the battery system 116. The estimated states output by the SOH/SOP estimator 208, and potentially other states output by the SPKF module 200, are then utilized by a motor control module 212, which is configured to control the electric motor 116. For example only, the SOP could be utilized by the motor control module 212 to maximize usage of the electric motor 116 or, in other words, to use the electric motor 116 as much as possible to generate the desired vehicle torque instead of engine 120. While not shown, it will be appreciated that at least some of these states could be output to other components, such as a malfunction indicator lamp (e.g., when the SOH is lower than a critical threshold) or to the driver interface 124 (e.g., to indicate a vehicle range corresponding to the SOC).

Figure 3:
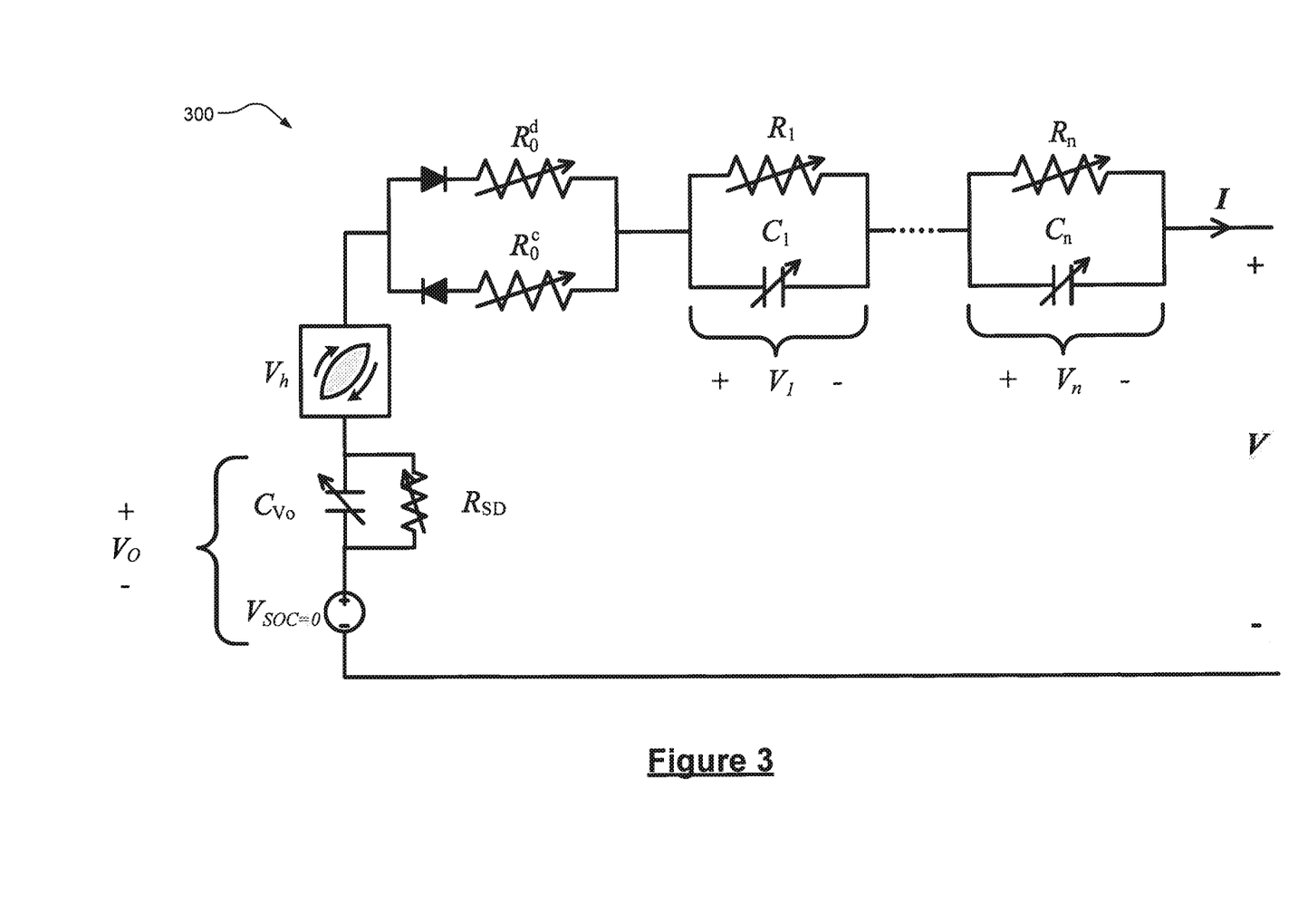
FIG. 3 is an example equivalent circuit model for a battery system of the hybrid vehicle according to the principles of the present disclosure.

Referring now to FIG. 3 and with continued reference to FIG. 2, an equivalent circuit model 300 for a particular cell of the battery system 116 is illustrated. While described with respect to a particular cell, it will be appreciated that the model could be extended to model the entire battery system 116 of the techniques discussed herein could be repeated for each cell of the battery system 116. V and I represent voltage and current for the particular cell. $V_O$ represents an open circuit voltage, which is also expressed as a sum of a component $V_{SOC}$ dependent on the SOC (hereinafter z, where $V_{SOC}=f(z)$) and a voltage $V_{Cvo}$ associated with a self-discharge capacitance $C_{Vo}$, which is a non-linear function of capacitor voltage. $R_{SD}$ represents a large self-discharge resistance and $v_h$ represents a hysteresis voltage, e.g., a unitless state value between −1 and 1 to represent dynamics of one-state hysteresis. Hysteresis voltage can be modelled as either zero state or one state hysteresis. Zero state hysteresis is modeled as:

$$V_h = V_h^{max} * sgn(I) \quad (1),$$

where $V_h^{max}$ is a maximum hysteresis magnitude, and I is current. One state hysteresis, on the other hand, is modelled as:

$$V_h = V_h^{max} * v_h \quad (2)$$

and $$\frac{dv_h}{dt} = -\gamma_h I \cdot (sgn(I) * v_h + 1), \quad (3)$$

where $v_h$ is a dynamically varying hysteresis voltage state and $\gamma_h$ is a one-state hysteresis gain factor.

The model 200 further defines n RC pairs having respective dynamic resistances $R_1 \ldots R_n$, capacitances $C_1 \ldots C_n$, and voltages $V_1 \ldots V_n$. $R_0^d$ represents an ohmic discharge resistance and $R_0^c$ represents an ohmic charge resistance. These ohmic/dynamic charge/discharge resistances and capacitances are variable and are generally dependent on SOC, temperature, current direction and current magnitude. For example, the ohmic/dynamic charge/discharge resistances could have non-linear forms such as:

$$R_i^c = R_i^{0,c} + R_i^{I,c} * \log(1+|I|) \quad (4)$$

and $$R_i^c = R_i^{0,d} + R_i^{I,c} * \log(1+|I|) \quad (5),$$

where i is a subscript value from 0 to n, $R_i^{I,c}$, $R_i^{I,d}$ are charge/discharge resistance values at zero current, and $R_i^{I,c}$, $R_i^{I,d}$ are charge/discharge non-linear resistance values. The usage of non-linear resistance models the battery response more accurately, particularly at lower temperatures (e.g., below zero degrees Celsius). These resistance values are commonly used to calculate and define resistance based on state of health (SOH), which could also be referred to as SOHR. Calculation of state of power (SOP) heavily relies on resistance estimation, since a higher battery resistance results in lower battery power availability.

The term "state" as used herein refers to an overall state of the battery system (charge, health, power, etc.) as well as a voltages of the battery system 116. Examples of the possible estimated states of the battery system 116 include $V_i$ (the voltage for the $i^{th}$ RC pair, i being an integer from 0 to n, which represents the model order and could be arbitrarily high), $V_{Cvo}$, z, $V_{SOC}$, $V_O$, and $v_h$. The term "parameter," on the other hand, refers to internal parameters of the battery system 116 (resistances, capacitances, charge/discharge time constants, etc.), such as with respect to the equivalent circuit model. Examples of the possible estimated parameters of the battery system 116 include $R_0^d$, $R_0^c$, $R_{SD}$, $C_i$ (the capacitance for the $i^{th}$ RC pair), $R_i$ (the resistance for the $i^{th}$ RC pair), and $C_{Vo}$, as well as the maximum magnitude of the hysteresis voltage $V_h^{max}$ and the one-state hysteresis gain $\gamma_h$. Further examples of the possible estimated parameters of the battery system 116 include, for the $i^{th}$ RC pair: linear ohmic discharge resistance $R_0^{0,d}$, linear ohmic charge resistance $R_0^{0,d}$, non-linear ohmic discharge resistance $R_0^{I,d}$, non-linear ohmic charge resistance $R_0^{I,d}$, dynamic RC discharge resistance $R_i^d$, dynamic RC charge resistance $R_i^c$, linear dynamic RC discharge resistance $R_i^{0,d}$, linear dynamic RC charge resistance $R_i^{0,d}$, non-linear dynamic RC discharge resistance $R_i^{I,d}$, non-linear dynamic RC charge resistance $R_i^{I,d}$, charge capacitance $C_i^c$, discharge capacitance $C_i^d$, time constant $\tau_i$, charge time constant $\tau_i^c$, and discharge time constant $\tau_i^d$.

A non-linear state-space model for the battery system 116 is:

$$x_k = f(x_{k-1}, u_{k-1}, \theta_{k-1}, k-1) + v_k \quad y_k = h(x_k, u_k, \theta_k, k) + w_k \quad (6),$$

where $v_k$ and $W_k$ each represent an independent, Gaussian noise process and follow Gaussian distributions N(0,Q) and N(0,R), respectively; $x_k$, $\theta_k$, $u_k$, and $y_k$ represent state, parameter, input, and state estimation output of the model at time k; and f and h represent non-linear functions of a state process model and a measurement model, respectively. The parameter's model, on the other hand, is:

$$d_k = c_k^T \theta_k + \omega_k \quad (7),$$

where $\omega_k$ represents an independent, Gaussian noise process and follows Gaussian distribution N(0,W), $d_k$ represents state, parameter, input, and state estimation output of the model at time k, and $c_k^T \in \Re^n$ is a regression vector composed of known/measurable quantities. RLS aims to find, recursively in time, an estimate of $\theta_k$ that minimizes the following sum of squared errors:

$$E(k) = \sum_{i=1}^{k} \lambda^{k-1} [d_i - c_i^T \theta_k]^2 \quad (8),$$

where $0 < \lambda < 1$ is a forgetting factor that diminishes the influence of old data.

In one exemplary implementation, the SPKF module 200 estimates SOC and RC pair voltage. If state of the model is $x_k = [z_k, V_{1,k}]^T$, then the state-space model is:

$$x_k = f(x_{k-1}, u_{k-1}, \theta_{k-1}, k-1) + v_{k-1} \quad (9)$$

$$\begin{bmatrix} z_k \\ V_{1,k} \end{bmatrix} = \begin{bmatrix} z_{k-1} - \dfrac{T_s \cdot I_{k-1}}{Capa} \\ \phi_{1,k-1} V_{1,k-1} + R_{1,k-1}(1-\phi_{1k-1})I_{k-1} \end{bmatrix} + v_k,$$

$$y_k = V_{o,k}(z_k) - R_{o,k} I_k - V_{1,k} + w_k$$

where $z_k$ represents SOC at time k and $$\phi_{1,k} = \exp\left(-\frac{T_s}{\tau_{1,k}}\right), \tau_{1,k} = R_{1,k} C_{1,k}.$$

In one exemplary implementation, the RLS module 204 estimates internal resistance $R_{o,k}$, resistance in RC pair $R_{1,k}$ and time constant in RC pair $\tau_k$. Battery SOH and SOHR can be calculated by module 208 using an equation based on both $R_{o,k}$ and $R_{1,k}$. The elements to be fed into the RLS module 204 are selected as follows:

$$\theta_k = [\phi_{1,k-1}, R_{1,k-1}(1-\phi_{1,k-1}) - R_{o,k-1}, \phi_{1,k-1}, R_{o,k}]^T \quad (10) \text{ and}$$

$$c_k = [V_{o,k-1} - V_{k-1}, I_{k-1}, I_k]^T \quad (11).$$

The measurement term of the RLS technique is:

$$\begin{aligned}
d_k &= V_{o,k} - V_k + \varpi_k \quad (12)\\
&= V_{1,k} + I_k R_{o,k} + \varpi_k\\
&= \phi_{1,k-1} V_{1,k-1} + R_{a,k-1}(1 - \phi_{1,k-1}) I_{k-1} + I_k R_{o,k} + \varpi_k\\
&= \phi_{1,k-1}(V_{o,k-1} V_{k-1} - I_{k-1} R_{o,k-1}) + R_{a,k-1}(1 - \phi_{1,k-1}) I_{k-1} + I_k R_{o,k} + \varpi_k\\
&= \phi_{1,k-1}(V_{o,k-1} - V_{k-1}) + (R_{a,k-1}(1 - \phi_{1,k-1}) - R_{o,k-1}\phi_{1,k-1}) I_{k-1} + I_k R_{o,k} + \varpi_k\\
&= c_k^T \theta_k + \varpi_k
\end{aligned}$$

The open circuit voltage of the battery model $V_{o,k}$, will be updated using look-up table and SOC $z_k$. Considering that high calculation frequency is utilized and parameters don't change very fast, it is assumed that all the parameters at the time (k−1) can be taken as the parameters at time k. Then they can be calculated by the result of RLS technique as follows:

$$\begin{cases} \tau_{1,k} = -\dfrac{T_s}{\ln[\theta_k(1)]} \\ R_{1,k} = \dfrac{\theta_k(2) + \theta_k(1)\theta_k(3)}{1 - \theta_k(1)} \\ R_{o,k} = \theta_k(3) \end{cases} \quad (13)$$

In one exemplary implementation, the forgetting factor λ is 0.99.

Figure 4A:
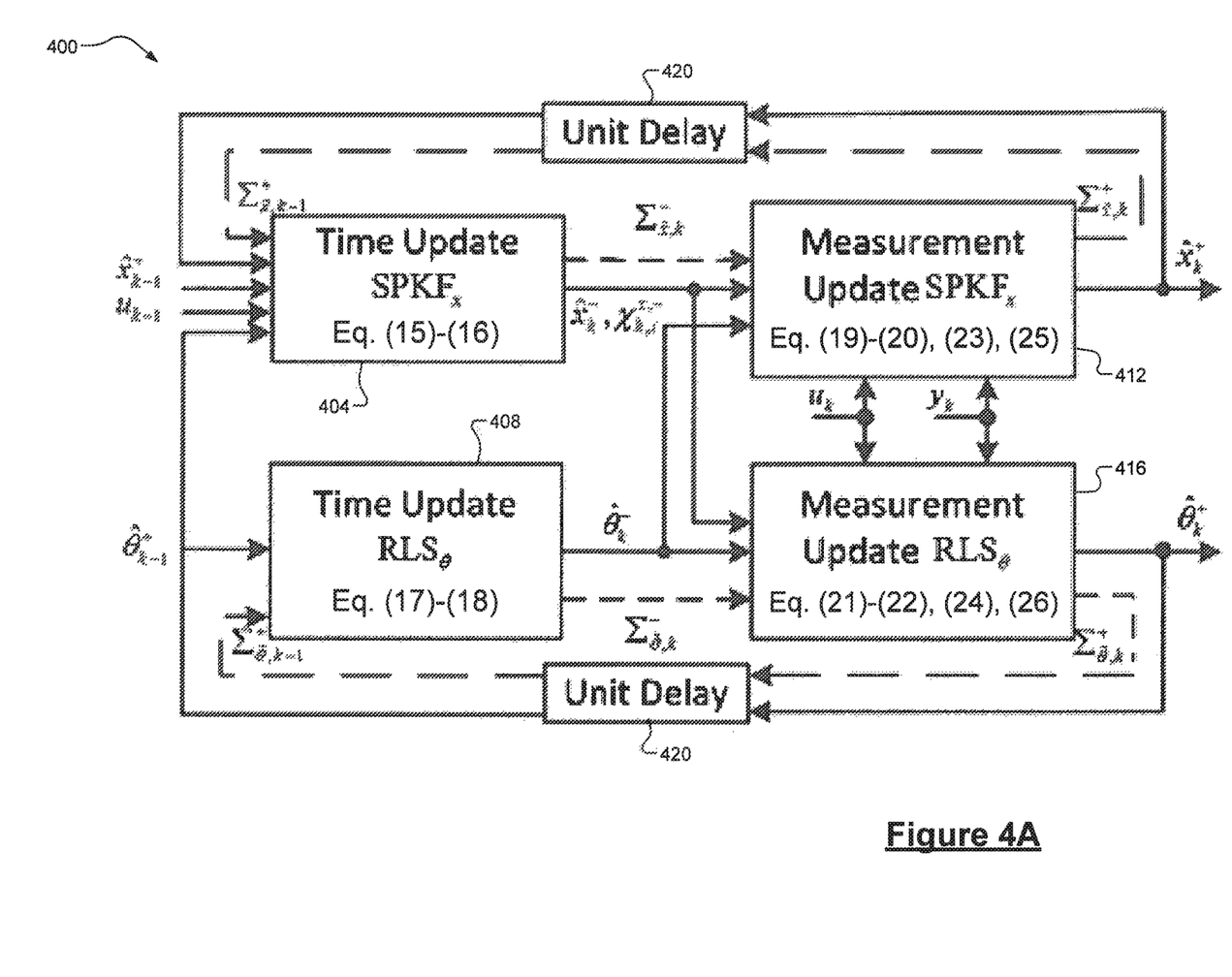
FIG. 4A is a functional block diagram of a first example architecture of a mixed sigma-point Kalman filtering (SPKF) and recursive least squares (RLS) technique according to the principles of the present disclosure.

Referring now to FIG. 4A, a functional block diagram of a first example architecture 400 for the mixed SPKF-RLS technique is illustrated. This architecture 400 represents a single time scale version of the SPKF-RLS technique and thus may also be referred to as a mixed or dual SPKF-RLS technique. The architecture generally includes SPKF and RLS time update blocks 404 and 408, respectively, SPKF and RLS measurement update blocks 412 and 416, respectively, and respective unit delays 420, 424. The equation details for the architecture 400 are listed below. In one exemplary implementation, block 404 executes equations (15)-(16), block 408 executes equations (17)-(18), block 412 executes equations (19)-(20), (23), and (25), and block 416 executes equations (21)-(22), (24), and (26).

Initialization for $k=0$, set
$$\begin{aligned} &\hat{\theta}_0^+ = E[\theta_0],\ \hat{x}_0^+ = E[x_0]\\ &\textstyle\sum_{\tilde{x},0}^+ = E[(x_0 - \hat{x}_0^+)(x_0 - \hat{x}_0^+)^T]\\ &\textstyle\sum_{\tilde{\theta},0}^+ = E[(\theta_0 - \hat{\theta}_0^+)(\theta_0 - \hat{\theta}_0^+)^T] \end{aligned} \quad (14)$$

State prediction (15)

$$\begin{cases} \mathcal{X}_{k-1}^+ = \{x_{k-1}^+, x_{k-1}^+ + \gamma(\sqrt{\Sigma_{x,k-1}^+})_{1st}, \dots, \hat{x}_{k-1}^+ + \gamma(\sqrt{\Sigma_{x,k-1}^+})_{pth}, x_{k-1}^+ - \\ \qquad \gamma(\sqrt{\Sigma_{x,k-1}^+})_{1st}, \dots, x_{k-1}^+ - \gamma(\sqrt{\Sigma_{x,k-1}^+})_{pth}\}\\ \mathcal{X}_{k,i}^+ = f(\mathcal{X}_{k-1,i}^+, \hat{\theta}_{k-1}^+, u_{k-1}k-1)\\ \hat{x}_k^- = \sum_{i=0}^{2p} \alpha_i^{(m)} \mathcal{X}_{k,j}^{x,-} \end{cases}$$

State prediction covariance $\sum_{\tilde{x},k}^- = \sum_{i=0}^{2p} \alpha_i^{(c)}(\mathcal{X}_{k,i}^{x,-} - \hat{x}_k^-)(\mathcal{X}_{k,i}^{x,-} - \hat{x}_k^-)^T + Q$ (16)

Parameter prediction $\hat{\theta}_k^- = \hat{\theta}_{k-1}^+$ (17)

Parameter prediction covariance $\sum_{\tilde{\theta},k}^- = \sum_{\tilde{\theta},k-1}^+$ (18)

State measurement prediction $\begin{cases} Y_{k,i} = h(\mathcal{X}_{k,i}^{x,-}, u_k, \hat{\theta}_k^-, k)\\ \hat{y}_k = \sum_{i=0}^{2p} \alpha_i^{(m)} Y_{k,i} \end{cases}$ (19)

State filter gain $\begin{cases} \sum_{\tilde{y},k} = \sum_{i=0}^{2p} \alpha_i^{(c)}(Y_{k,i} - \hat{y}_k)(Y_{k,i} - \hat{y}_k)^T + R\\ \sum_{\tilde{x}\tilde{y},k} = \sum_{i=0}^{2p} \alpha_i^{(c)}(\mathcal{X}_{k,i}^{x,-} - \hat{x}_k^-)(Y_{k,i} - \hat{y}_k)^T\\ L_k^x = \sum_{\tilde{x}\tilde{y},k} \sum_{\tilde{y},k}^{-1} \end{cases}$ (20)

Parameter measurement prediction $\hat{d}_k = c_k^T \hat{\theta}_k^-$ (21)

Parameter filter gain $L_k^\theta = \sum_{\tilde{\theta},k}^- c_k (\lambda + c_k^T \sum_{\tilde{\theta},k}^- c_k)^{-1}$ (22)

-continued

State measurement update $\hat{x}_k^+ = \hat{x}_k^- + L_k^x(y_k - \hat{y}_k)$ (23)

Parameter measurement update $\hat{\theta}_k^+ = \hat{\theta}_k^- + L_k^\theta(d_k - \hat{d}_k)$ (24)

State measurement covariance update $\sum_{\tilde{x},k}^+ = \sum_{\tilde{x},k}^- - L_k^x \sum_{\tilde{y},k} (L_k^x)^T$ (25)

Parameter measurement covariance update $\sum_{\tilde{\theta},k}^+ = \frac{1}{\lambda}(1 - L_k^\theta c_k^T)\sum_{\tilde{\theta},k}^-$ (26)

There are various methods to select sigma-point weighting constants. In one exemplary implementation, central difference Kalman filtering (CDKF) is utilized, which is summarized below:

$$\begin{array}{c|cccccc} & \gamma & \alpha_0^{(m)} & \alpha_k^{(m)} & \alpha_0^{(c)} & \alpha_k^{(c)} \\ \hline CDKF & h & \frac{h^2-L}{h^2} & \frac{1}{2h^2} & \frac{h^2-L}{h^2} & \frac{1}{2h^2} \end{array}$$

Where h may take any positive value and L represents the state number. For Gaussian, h could equal the square root of 3.

Figure 4B:
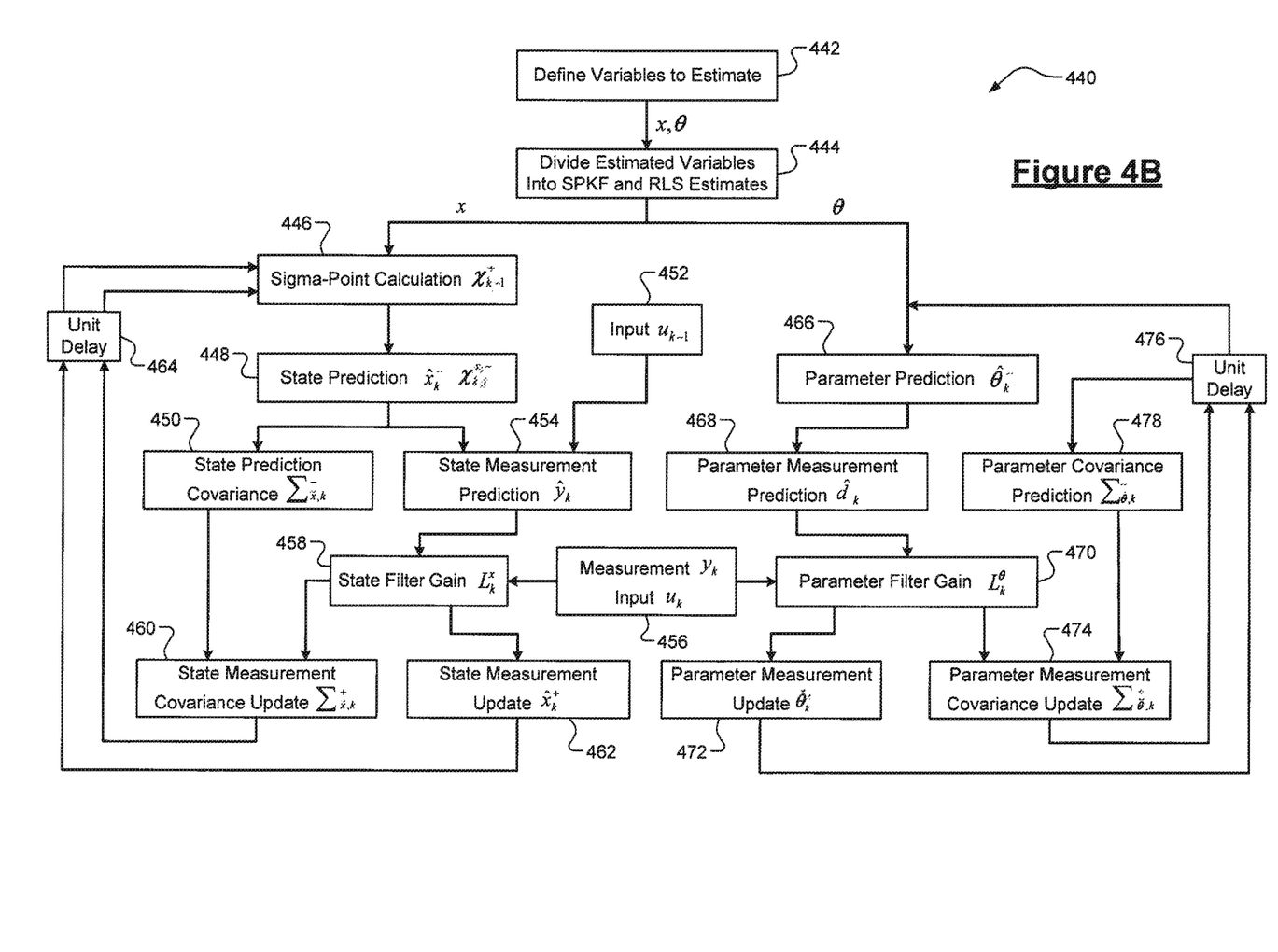
FIG. 4B is a flow diagram of a first example method of estimating battery system states/parameters according to the principles of the present disclosure.

Referring now to FIG. 4B, a flow diagram of a first method 440 of estimating battery system states/parameters is illustrated. This first method 440, for example, could correspond to the architecture 400 illustrated in FIG. 4A and discussed above. Variables to estimate are defined at 442 and divided for SPKF/RLS at 444. In a first branch, sigma-point calculation occurs at 446 and states are predicted at 448. State prediction co-variance is determined at 450 and state measurement prediction is performed at 454 based on input received at 452. State filter gain is determined at 458 based on information received at 456. State measurement covariance and measurement are updated at 460 and 462, respectively, after which a unit delay occurs at 464 and the process returns to 446. In a second branch, parameter prediction occurs at 466 and parameter measurement prediction occurs at 468. Parameter filter gain is determined at 470 based on the information received at 456 and used to update parameter measurement and measurement covariance at 472 and 474, respectively. A unit delay occurs at 476 and then the parameter prediction covariance is determined at 476, which is fed back into the related update block 474.

Figure 5A:
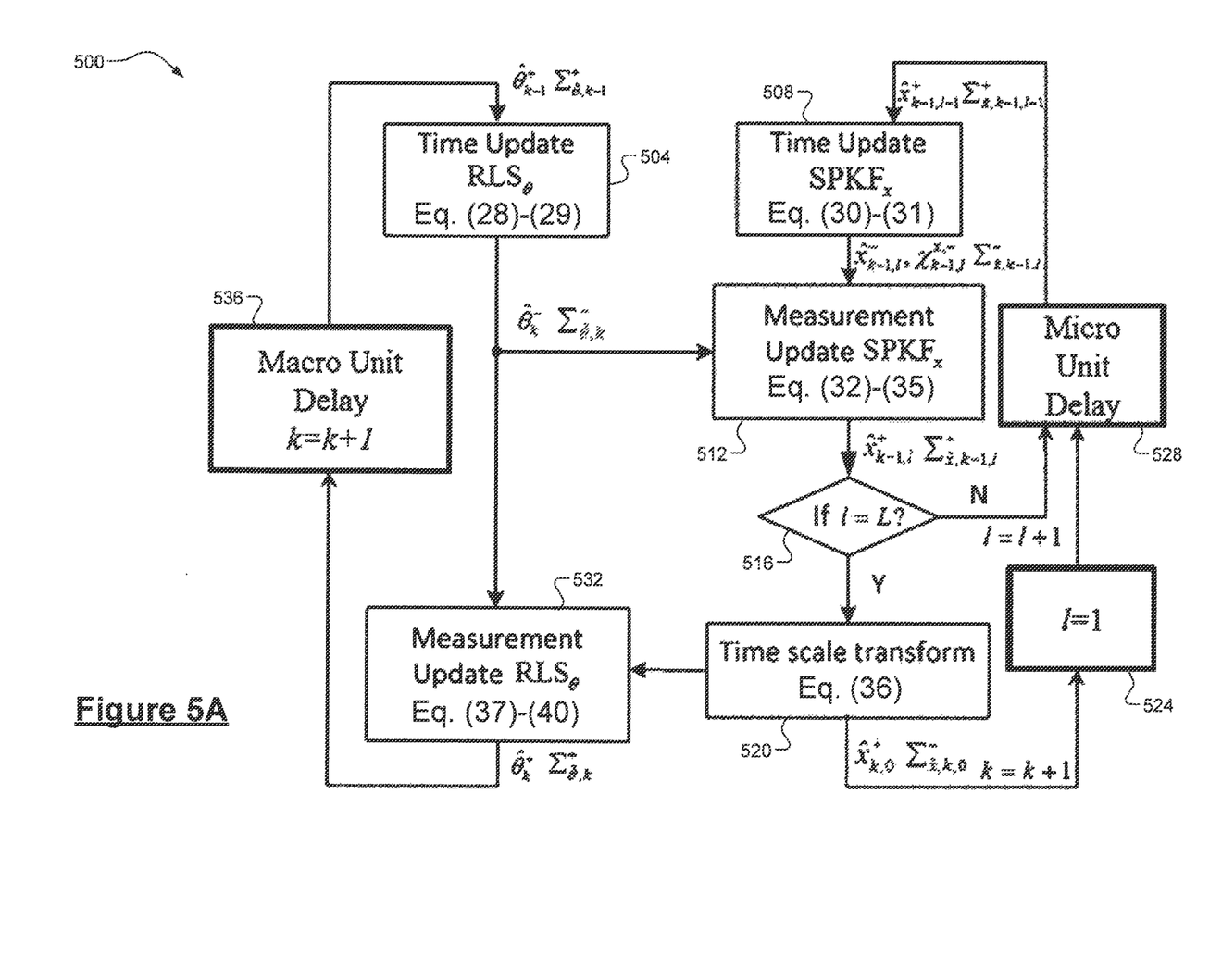
FIG. 5A is a functional block diagram of a second example architecture of the mixed SPKF-RLS technique according to the principles of the present disclosure.

Referring now to FIG. 5A, a functional block diagram of a second example architecture 500 for the mixed SPKF-RLS technique is illustrated. This architecture 500 represents a multi-scale version of the SPKF-RLS technique and thus may also be referred to as a multi-scale mixed or dual SPKF-RLS technique. The architecture generally includes RLS and SPKF time update blocks 504 and 508, respectively, SPKF and RLS time update blocks 512 and 532, respectively, micro and macro unit delays 528 and 536, respectively, as well as decision block 516 and time scale transform blocks 520, 524. The equation details for the architecture 500 are listed below. In one exemplary implementation, block 504 executes equations (28)-(29), block 508 executes equations (30)-(31), block 512 executes equations (32)-(35), block 520 executes equation (36), and block 532 executes equations (37)-(40).

Initialization for $k = 0$, set $\hat{\theta}_0^+ = E[\theta_0]$ (27)

$$\hat{x}_{0,0}^+ = E[x_{0,0}]$$

$$\sum\nolimits_{\tilde{x},0,0}^+ = E\left[(x_{0,0} - \hat{x}_{0,0}^+)(x_{0,0} - \hat{x}_{0,0}^+)^T\right]$$

$$\sum\nolimits_{\tilde{\theta},0}^+ = E\left[(\theta_0 - \hat{\theta}_0^+)(\theta_0 - \hat{\theta}_0^+)^T\right]$$

Parameter prediction with macro scale $\hat{\theta}_k^- = \hat{\theta}_{k-1}^+$ (28)

Parameter prediction covariance with macro scale $\sum_{\tilde{\theta},k}^- = \sum_{\tilde{\theta},k-1}^+$ (29)

State prediction with micro scale (30)

$$\begin{cases} \mathcal{X}_{k-1,l-1}^+ = \left\{x_{k-1,l-1}^+, x_{k-1,l-1}^+ + \gamma\left(\sqrt{\sum_{\tilde{x},k-1,l-1}^+}\right)_{1st}, \dots, \hat{x}_{k-1,l-1}^+ + \gamma\left(\sqrt{\sum_{\tilde{x},k}^+}\right)\hat{x}_{k-1,l-1}^+ - \right. \\ \left. \gamma\left(\sqrt{\sum_{\tilde{x},k-1,l-1}^+}\right)_{1st}, \dots, x_{k-1,l-1}^+ - \gamma\left(\sqrt{\sum_{\tilde{x},k-1,l-1}^+}\right)_{pth}\right\} \\ \mathcal{X}_{k-1,i,l}^{x,-} = f\left(\mathcal{X}_{k-1i,l-1}^+, \hat{\theta}_{k-1}^+, u_{k-1,l-1}k-1, l-1\right) \\ \hat{x}_{k-1,l}^- = \sum_{i=0}^{2p} \alpha_i^{(m)} \mathcal{X}_{k-1,i,l}^+ \end{cases}$$

State prediction covariance with micro scale $\sum_{\tilde{x},k-1,l}^- =$ (31)

$$\sum\nolimits_{i=0}^{2p} \alpha_i^{(c)}\left(\mathcal{X}_{k-1,i,l}^{x,-} - \hat{x}_{k-1,l}^-\right)\left(\mathcal{X}_{k-1,i,l}^{x,-} - \hat{x}_{k-1,l}^-\right)^T + Q$$

-continued

State measurement prediction with micro scale
$$\begin{cases} Y_{k-1,i,l} = h(X^{x,-}_{k-1,i,l}, u_{k-1,l}, \hat{\theta}^-_k, k-1, l) \\ \hat{y}_{k-1,l} = \sum_{i=0}^{2p} \alpha_i^{(m)} Y_{k-1,i,l} \end{cases} \quad (32)$$

State filter gain with micro scale
$$\begin{cases} \sum_{\tilde{y},k-1,l} = \sum_{i=0}^{2p} \alpha_i^{(c)} (Y_{k-1,i,l} - \hat{y}_{k-1,l})(Y_{k-1,i,l} - \hat{y}_{k-1,l})^T + R \\ \sum_{\tilde{x}\tilde{y},k-1,l} = \sum_{i=0}^{2p} \alpha_i^{(c)} (X^{x,-}_{k-1,i,l} - \hat{x}^-_{k-1,l})(Y_{k-1,i,l} - \hat{y}_{k-1,l})^T \\ L^x_{k-1,l} = \sum_{\tilde{x}\tilde{y},k-1,l} \sum_{\tilde{y},k-1,l}^{-1} \end{cases} \quad (33)$$

State measurement update with micro scale $\hat{x}^+_{k-1,l} = \hat{x}^-_{k-1,l} + L^x_{k-1,l}(y_{k-1,l} - \hat{y}_{k-1,l})$ (34)

State measurement covariance update with micro scale $\sum^+_{\tilde{x},k-1,l} = \sum^-_{\tilde{x},k-1,l} - L^x_{k-1,l}\sum_{\tilde{y},k-1,l}(L^x_{k-1,l})^T$ (35)

Time scale transform when $l = L$ $\hat{x}^+_{k,0} = \hat{x}^+_{k-1,L}$, $\sum^+_{\tilde{x},k,0} = \sum^+_{\tilde{x},k-1,L}$ (36)

Parameter measurement prediction with macro scale $\hat{d}_k = c_k^T \hat{\theta}^-_k$ (37)

Parameter filter gain with macro scale $L^\theta_k = \sum^-_{\tilde{\theta},k} c_k (\lambda + c_k^T \sum^-_{\tilde{\theta},k} c_k)^{-1}$ (38)

Parameter measurement update with macro scale $\hat{\theta}^+_k = \hat{\theta}^-_k + L^\theta_k(d_k - \hat{d}_k)$ (39)

Parameter measurement covariance update with macro scale $\sum^+_{\tilde{\theta},k} = \frac{1}{\lambda}(1 - L^\theta_k c_k^T)\sum^-_{\tilde{\theta},k}$ (40)

Figure 5B:
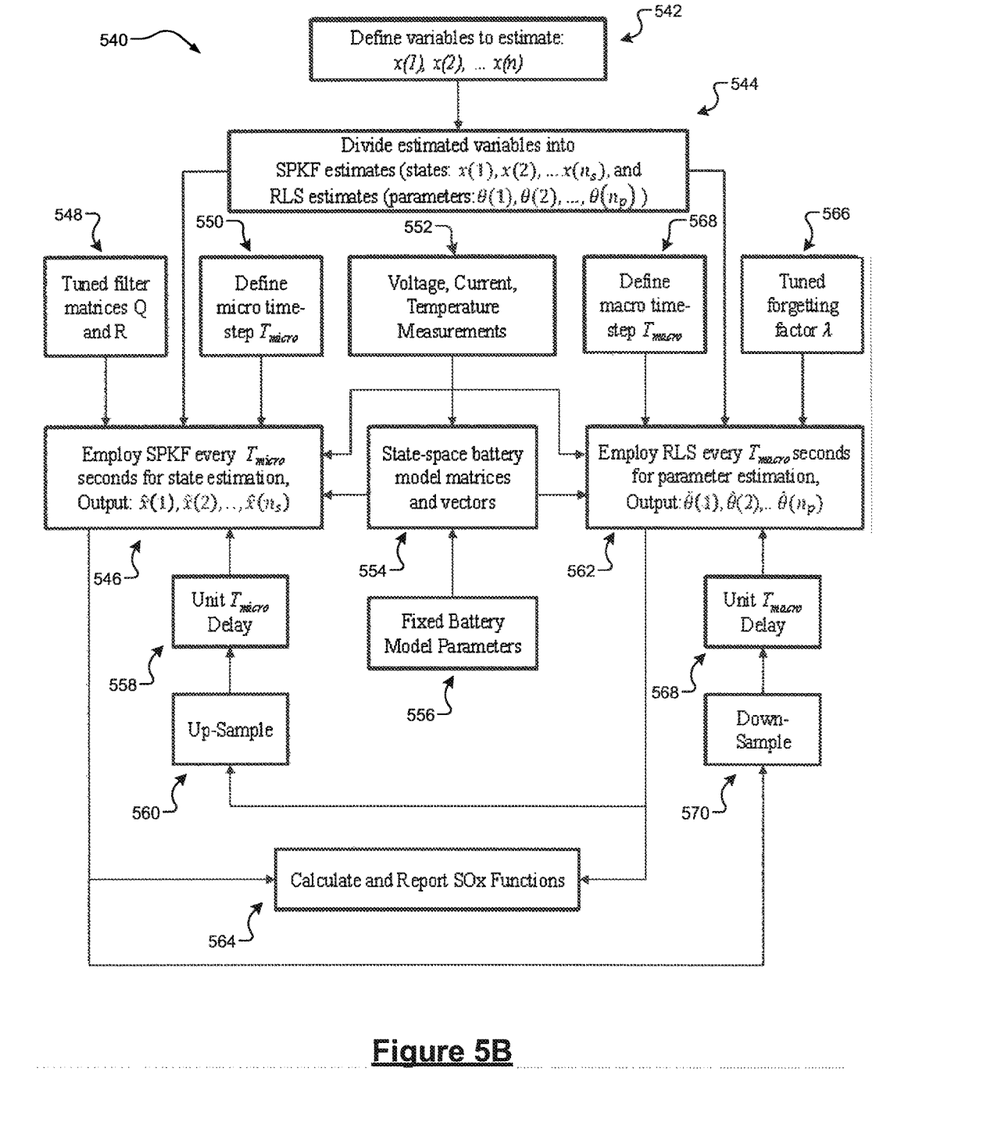
FIG. 5B is a flow diagram of a second example method of estimating battery system states/parameters according to the principles of the present disclosure.

Referring now to FIG. 5B, a flow diagram of a second method 540 of estimating battery system states/parameters is illustrated. This second method 540, for example, could correspond to the second architecture 500 illustrated in FIG. 5A and discussed above. Since the capacity changes very slowly, it is sufficient to be recalibrated once at several days or weeks, and thus it can be updated at each macro time-step. Variables to estimate are defined at 542 and divided for SPKF and RLS at 544. In a first branch, SPKF is performed at an SPKF rate at 546. Inputs to 546 included tuned filter matrices (548), a micro time-step (550), state-space batter model matrices and vectors (554), and a micro unit delay (558). Voltage, current, and temperature measurements are obtained at 552 and fed into 554 along with fixed battery model parameters obtained at 556. The micro unit delay at 558 is obtained by up-sampling an output of an RLS block (562) at 560. In a second branch, RLS is performed at an RLS rate at 562. The SPKF rate will generally be faster than the RLS rate, but it will be appreciated that RLS could be performed more often than SPKF. Inputs to the RLS block 562 include a macro time-scale (568), a tuned forgetting factor (566), and a macro unit delay (568). The macro unit delay at 568 is obtained by down-sampling the output of the SPKF block (546) at 570. The outputs of both the SPKF block 546 and the RLS block 562 are reported at 564 and used, for example, to calculate other values (SOH, SOP, etc.).

The following Tables 1-2 provide further evidence as to the decreased computational complexity and easier tuning of the mixed or dual SPKF-RLS techniques (both single time interval and multi-scale) according to the present disclosure. As can be seen, the computational complexity is orders of magnitude smaller for these techniques compared to other techniques and there are also many fewer tunable variables.

TABLE 1

Example Computational Complexity Comparison

| # of state and parameters variables | Computational Complexity[a] | | | |
|---|---|---|---|---|
| | Joint SPKF[b] | Dual SPKF[b] | Dual SPKF-RLS[b] (proposed) | Multi-scale Dual SPKF-RLS[c] (proposed) |
| 4 | 640 | 160 | 120 | 84 |
| 6 | 2160 | 540 | 360 | 279 |
| 8 | 5120 | 1280 | 800 | 656 |
| 10 | 10000 | 2500 | 1500 | 1275 |
| n | f · n³ | 2 · f · (n − 1)² | f · ((n − 1)² + (n − 1)³) | f₁ · (n − 1)² + f₂ · (n − 1)³ |

[a]same number of state and parameter variables, each $n_s = n_p = n/2$
[b]same state/parameter estimation frequency of f = 10
[c]state estimation frequency $f_1 = 10$, parameter estimation frequency $f_2 = 1$

TABLE 2

Example Comparison of Number Tunable Time-Varying Filter Variables

| # of state and parameters variables | Number of Tunable Time-Varying Filter Variables * | | |
|---|---|---|---|
| | Joint SPKF | Dual SPKF | Dual SPKF-RLS (proposed) |
| 2 | 5 | 3 | 3 |
| 4 | 17 | 9 | 6 |
| 6 | 37 | 19 | 11 |
| 8 | 65 | 33 | 18 |
| 10 | 101 | 51 | 27 |
| n | n² + 1 | 2(n − 1)² + 1 | (n − 1)² + 2 |

* same number of state and parameter variables, each $n_s = n_p = n/2$

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A battery management system for an electrified powertrain of a hybrid vehicle, the system comprising:
   one or more sensors configured to measure voltage, current, and temperature for a battery system of the hybrid vehicle; and
   a controller configured to:
      obtain an equivalent circuit model for the battery system;
      determine a set of states for the battery system to be estimated;
      determine a set of parameters for the battery system to be estimated;
      receive, from the one or more sensors, the measured voltage, current, and temperature for the battery system;
      using (i) the equivalent circuit model, (ii) the measured voltage, current, and temperature of the battery system, and (iii) a mixed sigma-point Kalman filtering (SPKF) and recursive least squares (RLS) technique to estimate the sets of states and parameters for the battery system; and
      using the sets of estimated states and parameters for the battery system to control an electric motor of the electrified powertrain.

2. The system of claim 1, wherein the controller is configured to estimate:
   the set of states for the battery system using an SPKF technique; and
   the set of parameters for the battery system using an RLS technique.

3. The system of claim 2, wherein the controller is further configured to estimate:
   the set of parameters for the battery system estimated using the RLS technique are an input for the SPKF technique; and
   the set of states for the battery system estimated using the SPKF technique are an input for the RLS technique.

4. The system of claim 1, wherein the set of states includes at least one of a state of charge (SOC) of the battery system and a voltage of the battery system.

5. The system of claim 2, wherein the SPKF technique and the RLS technique are both configured to estimate a particular state or parameter for the battery system, and wherein the controller is configured to estimate the particular state or parameter of the battery system based on at least one of these estimates.

6. The system of claim 5, wherein the controller is further configured to calculate a covariance indicative of a confidence in each estimate of the particular state or parameter for the battery system, wherein the controller is configured to utilize the covariance in estimating the particular state or parameter of the battery system.

7. The system of claim 5, wherein the controller is configured to estimate the particular state or parameter for the battery system based on an average of the estimates from the SPKF and RLS techniques.

8. The system of claim 2, wherein the controller is configured to estimate the set of parameters for the battery system using the RLS technique based further on a tuned forgetting factor.

9. The system of claim 1, wherein the set of parameters includes at least one of a resistance and a charge/discharge time constant for the battery system.

10. The system of claim 1, wherein the equivalent circuit model is an asymmetric equivalent circuit model having charge/discharge asymmetry.

11. The system of claim 2, wherein the controller is further configured to:
    obtain an SPKF rate at which to perform the SPKF technique;
    obtain an RLS rate at which to perform the RLS technique; and
    estimate the sets of states and parameters for the battery system using the SPKF and RLS techniques according to their respective rates.

12. The system of claim 10, wherein the SPKF rate is greater than the RLS rate.

13. The system of claim 1, wherein the controller is further configured to estimate at least one of a state of power (SOP) and a state of health (SOH) for the battery system based on the sets of estimated states and parameters.

14. The system of claim 1, wherein the controller is configured to control the electric motor based further on the at least one of the SOP and the SOH for the battery system.

15. The system of claim 1, wherein:
    the hybrid vehicle comprises an engine; and
    the controller is configured to coordinate control of the engine and the electric motor based on the estimated states/parameters to maximize usage of the electric motor.

* * * * *